United States Patent
Do et al.

(10) Patent No.: US 12,384,803 B2
(45) Date of Patent: Aug. 12, 2025

(54) NON-CRYOGENIC SYNTHESIS OF HETEROATOM-BRIDGE PRECURSORS OF METAL-LIGAND COMPLEX CATALYSTS

(71) Applicant: Dow Global Technologies LLC, Midland, MI (US)

(72) Inventors: Hien Q. Do, Lake Jackson, TX (US); Philip P. Fontaine, Lake Jackson, TX (US); Arkady L. Krasovskiy, Lake Jackson, TX (US); Liam P. Spencer, Lake Jackson, TX (US); Kelli A. Ogawa, Midland, MI (US); Daniel K. Lesniewski, Lake Jackson, TX (US); Russell W. Anderson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 107 days.

(21) Appl. No.: 17/801,628

(22) PCT Filed: Feb. 10, 2021

(86) PCT No.: PCT/US2021/017386
§ 371 (c)(1),
(2) Date: Aug. 23, 2022

(87) PCT Pub. No.: WO2021/173345
PCT Pub. Date: Sep. 2, 2021

(65) Prior Publication Data
US 2023/0146294 A1 May 11, 2023

Related U.S. Application Data

(60) Provisional application No. 62/980,655, filed on Feb. 24, 2020.

(51) Int. Cl.
| | | |
|---|---|---|
| *C07F 7/08* | (2006.01) | |
| *C08F 4/76* | (2006.01) | |
| *C08F 10/02* | (2006.01) | |
| *C08F 10/06* | (2006.01) | |

(52) U.S. Cl.
CPC ............ *C07F 7/0812* (2013.01); *C07F 7/081* (2013.01); *C08F 4/76* (2013.01); *C08F 10/02* (2013.01); *C08F 10/06* (2013.01)

(58) Field of Classification Search
CPC ........ C07F 7/081; C07F 7/0812; C08F 10/02; C08F 10/06; C08F 4/64193; C08F 4/659; C08F 4/76
See application file for complete search history.

(56) References Cited

FOREIGN PATENT DOCUMENTS

| | | |
|---|---|---|
| EP | 0464844 A1 | 1/1992 |
| WO | 2018022975 A1 | 2/2018 |

OTHER PUBLICATIONS

Dorwald F. A. Side Reactions in Organic Synthesis, 2005, Wiley: VCH, Weinheim p. IX of Preface.*
Strohmann (Chem. Ber. 1996, 129, 799-805).*
International Search Report and Written Opinion dated Apr. 23, 2021, pertaining to Int'l Patent Application No. PCT/US2021/017386, 14 pgs.
Knorr et al. "(Phenylthiomethyl)silanes and (butyltelluromethyl)silanes as novel bifunctional ligands for the construction of dithioether-, ditelluroether- and transition metal-silicon complexes" Inorganen Chimica Acta 350 (2003) 455-466.

(Continued)

*Primary Examiner* — Pancham Bakshi
(74) *Attorney, Agent, or Firm* — Dinsmore & Shohl LLP

(57) ABSTRACT

Embodiments are directed to a metal-ligand complex catalyst precursor, $(L^1)(L^2)X(R^1)(R^2)$, and methods for producing the same from a compound of formula $Q_2X(R^1)(R^2)$. $L^1$ and $L^2$ are independently —$R^3$—$Z^1$ or —$R^4$—$Z^1$. $R^1$ and $R^2$ are independently selected from a hydrogen atom, $(C_1$-$C_{40})$ hydrocarbyl and, optionally, $R^1$ and $R^2$ are connected to form a ring having from 3 to 50 atoms in the ring, excluding hydrogen atoms. X is Si, Ge, Sn, or Pb. Each Q is independently $Ar^1$—$Y^1R^3$— or $Ar^2$—$Y^2$—$R^4$—. $R^3$ and $R^4$ are independently selected from —$(CR^C_2)_m$—, where m is 1 or 2, and where each $R^C$ is independently selected from the group consisting of $(C_1$-$C_{40})$hydrocarbyl, $(C_1$-$C_{40})$heterohydrocarbyl, and —H. $Y^1$ and $Y^2$ are independently S, Se, or Te. $Ar^1$ and $Ar^2$ are independently $(C_6$-$C_{50})$aryl. $Ar^1$—$Y^1$—$R^3$— and $Ar^2$—$Y^2$—$R^4$— are not identical. Each $Z^1$ is independently selected from Cl, Br, and I.

11 Claims, No Drawings

(56) References Cited

OTHER PUBLICATIONS

Kobayashi et al. "A General, High-Yield Reaction for the Formation of (Chloromethyl)oligosilanes", Organometallics, vol. 9, No. 8, 1990, 3 pgs.

Kobayashi et al. "Synthesis of (Chloromethyl)silanes by the Low-Temperature Reaction of Chlorosilanes and in Situ Generated (Chloromethyl)lithium in Tetrahydrofuran", Organometallics 1991, 10, 1960-1964, 5 pgs.

Corey et al. "A Synthetic Method for the Homologation of Primary Halides", Tetrahedron Letters No. 55, pp. 5787-5788, 1968, 2 pgs.

Touqeer et al. "Homologation of halostannanes with carbenoids: a convenient and straightforward one-step access to a-functionalized organotin reagents", Chem. Commun., 2018, 54, 10112, 4 pgs.

Apfel et al. "Models for the Active Site in [FeFe] Hydroganase with Iron-Bound Ligands Derived from Bis-, Tris-, and Tetrakis(mercaptomethyl)silanes", Inorg. Chem. 2010, 49, 10117-10132, 16 pgs.

Japanese Office Action dated Jan. 7, 2025, pertaining to JP Patent Application No. 2022-550211, 6 pgs.

Akkerman et al. "The synthesis and some applications of new 1,3-dillithiopropanes: dimethylbis(a-lithiobenzyl)silane and its germanium analogue", Journal of Organometallic Chemistry, 338 (1988) 159-168.

Brasington et al. "Functionally Submitted Organotin Compounds", Journal of Organometallic Chemistry, 40 (1972).

Strohmann et al. "Bis-, Tris- and Tetrakis(lithiomethyl)germanes: New Building Blocks for Organogermanium Compounds", Z. Naturforsch. 59b, 1570-1578 (2004).

Knorr et al. "Synthesis and Molecular Structures of Platinum and Mercury Complexes Chelated by (Phenylthiomethyl)silane Ligands", Z. Anorg. Allg. Chem. 2004, 630, 1955-1961.

Oishi et al. "Stereoselective formation of phenylthio groups substituted 1-metalla-3-titanacyclobutanes", Journal of Organometallic Chemistry 696 (2011) 581-585.

Chinese Office Action dated Nov. 11, 2024, pertaining to CN Patent Application No. 202180014744.7, 14 pgs.

Japanese Office Action dated Jan. 7, 2025, pertaining to JP Patent Application No. 2022-550211, 7 pgs.

Brazilian Technical Report dated Apr. 10, 2025, pertaining to BR Patent Application No. BR112022016291.0, 8 pgs.

* cited by examiner

NON-CRYOGENIC SYNTHESIS OF HETEROATOM-BRIDGE PRECURSORS OF METAL-LIGAND COMPLEX CATALYSTS

CROSS REFERENCES TO RELATED APPLICATIONS

This application is a national-stage application under 35 U.S.C. § 371 of International Application No. PCT/US2021/017386, filed Feb. 10, 2021, which International Application claims benefit of priority to U.S. Provisional Application No. 62/980,655, filed Feb. 24, 2020.

TECHNICAL FIELD

Embodiments of the present disclosure generally relate to olefin polymerization catalyst systems and processes and, more specifically to precursors of metal-ligand complex catalyst systems for olefin polymerization and to methods of making the precursors.

BACKGROUND

Olefin-based polymers, such as ethylene-based polymers and/or propylene-based polymers, are produced via various catalyst systems. Selection of such catalyst systems used in the polymerization process of the olefin based polymers is an important factor contributing to the characteristics and properties of such olefin based polymers.

Ethylene-based polymers and propylene-based polymers are manufactured for a wide variety of articles. The ethylene-based polymers polymerization process can be varied in a number of respects to produce a wide variety of resultant polyethylene resins having different physical properties that render the various resins suitable for use in different applications.

The chemical industry strives to develop catalyst systems that include metal-ligand complexes with improved selectivity between comonomer and ethylene under olefin polymerization reaction conditions (e.g., temperature). The catalyst systems would be capable of polymerization reactions that provide new compositions of matter (e.g., new polyolefin compositions), improve reaction yields, provide alternative substrate selectivities (e.g., provide a new relative selectivity for a monomer and co-monomer in making a polyolefin copolymer), improve process safety, or a combination thereof.

Heteroatom-bridged bis(biphenylphenoxy) catalyst systems, which are an exemplary type of metal-ligand complex, have shown promise in commercial plants for multiple product platforms. However, the current synthesis of heteroatom bridges requires cryogenic conditions, e.g., reaction temperatures of −78° C., leading to considerable cost for large scale production.

SUMMARY

Ongoing needs exist for practical and cost-effective methods for the preparation of heteroatom bridges in high yield under non-cryogenic conditions. According to aspects, a compound of $Q_2X(R^1)(R^2)$ is provided. $R^1$ and $R^2$ are independently selected from a hydrogen atom, $(C_1-C_{40})$hydrocarbyl and, optionally, $R^1$ and $R^2$ are connected to form a ring having from 3 to 50 atoms in the ring, excluding hydrogen atoms. X is Si, Ge, Sn, or Pb. Each Q is independently $Ar^1-Y^1-R^3-$ or $Ar^2-Y^2-R^4-$. $R^3$ and $R^4$ are independently selected from $-(CR^C_2)_m-$, where m is 1 or 2, and where each $R^C$ is independently selected from the group consisting of $(C_1-C_{40})$hydrocarbyl, $(C_1-C_{40})$heterohydrocarbyl, and $-H$. $Y^1$ and $Y^2$ are independently S, Se, or Te. $Ar^1$ and $Ar^2$ are independently $(C_6-C_{50})$aryl. $Ar^1-Y^1-R^3-$ and $Ar^2-Y^2-R^4-$ are not identical.

According to a twelfth aspect, a method for providing a heteroatom-bridge precursor, $(L^1)(L^2)X(R^1)(R^2)$, includes reacting at least one alkyl halide, a metal halide, and a compound of formula $Q_2X(R_1)(R_2)$, at from 90° C. to 150° C., where X, Q, $R^1$, and $R^2$ are as defined above, to provide the heteroatom-bridge precursor. $L^1$ and $L^2$ are independently $-R^3-Z^1$ or $-R^4-Z^1$ and each $Z^1$ is independently selected from Cl, Br, and I.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

DETAILED DESCRIPTION

In the field of catalyst systems, examples of heteroatom bridges within procatalyst or catalyst molecules may be described generically as divalent moieties having a structure such as formula (A):

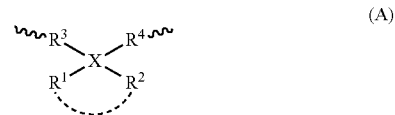

(A)

In formula (A), $R^1$ and $R^2$ are independently selected from a hydrogen atom and $(C_1-C_{40})$hydrocarbyl. Optionally, as indicated by the dashed line, $R^1$ and $R^2$ may be connected to form a ring having from 3 to 50 atoms in the ring, excluding hydrogen atoms. In formula (A), X may be silicon (Si), germanium (Ge), tin (Sn), or lead (Pb). In formula (A), $R^3$ and $R^4$ are independently selected from $-(CR^C_2)_m-$, where m is 1 or 2, and where each $R^C$ is independently selected from $(C_1-C_{40})$hydrocarbyl, $(C_1-C_{40})$heterohydrocarbyl, or $-H$. When all $R^C$ in $R^3$ and $R^4$ are $-H$, for example, $R^3$ and $R^4$ may be methylene or ethan-1,2-diyl. In formula (A), the wavy lines extending from $R^3$ and $R^4$ denote a connection of the heteroatom bridge to the main portion of the procatalyst or catalyst molecule.

In small-scale and large-scale synthetic routes for preparing heteroatom-bridged procatalysts, the heteroatom bridges may be incorporated into the procatalyst or catalyst molecule in one or more steps. The steps may include reacting an intermediate compound to the procatalyst or catalyst with a heteroatom-bridge precursor. An example class of heteroatom-bridge precursors includes compounds such as those defined according to formula (1):

(1)

In formula (1), X is selected from Si, Ge, Sn, and Pb. $R^1$ and $R^2$ are independently selected from a hydrogen atom and ($C_1$-$C_{40}$)hydrocarbyl. Optionally $R^1$ and $R^2$ are connected to form a ring having from 3 to 50 atoms in the ring, excluding hydrogen atoms.

The groups $L^1$ and $L^2$ in the compound of formula (1) may be identical to each other, in which case the compound is symmetric with respect to $L^1$ and $L^2$. Alternatively, the two groups $L^1$ and $L^2$ may be different from each other, in which case the compound is asymmetric with respect to $L^1$ and $L^2$. Compounds of formula (1) that are either symmetric or asymmetric with respect to the two portions $L^1$ and $L^2$ may be distinguishable in that in the symmetric compounds, both groups $L^1$ and $L^2$ are identical groups $Z^1$—$R^3$—, whereas in the asymmetric compounds, $L^1$ is $Z^1$—$R^3$— and $L^2$ is $Z^1$—$R^4$—, where $Z^1$—$R^3$— and $Z^1$—$R^4$— are not identical, $Z^1$ being selected from chlorine (Cl), bromine (Br), and iodine (I). $R^3$ and $R^4$ are independently selected from —$(CR^C_2)_m$—, where m is 1 or 2, and where each $R^C$ is independently selected from ($C_1$-$C_{40}$)hydrocarbyl, ($C_1$-$C_{40}$) heterohydrocarbyl, and —H.

Accordingly, with respect to the groups $L^1$ and $L^2$, compounds of formula (1) include symmetric compounds of formula (1A) and asymmetric compounds of formula (1B), as follows, where all variable groups in both formulas are defined as in formula (1) and all variable groups having multiple instances in a single structure are identical in every instance:

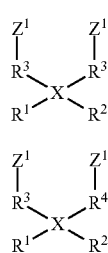

In some instances, synthesis of the heteroatom-bridge precursor may itself present challenges or need improvements such as decreased cost or greater efficiency. As with any chemical synthesis, such improvements may be realized through implementation of alternative synthetic strategies. The alternative synthetic strategies may include conducting the synthesis through different starting materials or intermediates.

Accordingly, embodiments of this disclosure include compounds having uses that may include functioning as intermediates for preparing, providing, or synthesizing heteroatom-bridge precursors, such as those having formula (1) as previously described. Further embodiments of this disclosure include synthetic methods for preparing the heteroatom-bridge precursors. The synthetic methods incorporate the intermediate compounds in a reaction step during the preparation.

Specific embodiments of the intermediate compounds for heteroatom-bridge precursors will now be described. It should be understood that the intermediate compounds of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The intermediate compounds according to embodiments include compounds according to formula (3):

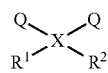

In formula (3), $R^1$ and $R^2$ are independently selected from a hydrogen atom, ($C_1$-$C_{40}$)hydrocarbyl and, optionally, $R^1$ and $R^2$ are connected to form a ring having from 3 to 50 atoms in the ring, excluding hydrogen atoms; X is Si, Ge, Sn, or Pb; and each Q is independently $Ar^1$—$Y^1$—$R^3$— or $Ar^2$—$Y^2$—$R^4$—. Of the various components of Q in formula (3), $R^3$ and $R^4$ are independently selected from —$(CR^C_2)_m$—, where m is 1 or 2, and where each $R^C$ is independently selected from the group consisting of ($C_1$-$C_{40}$)hydrocarbyl, ($C_1$-$C_{40}$)heterohydrocarbyl, and —H. $Y^1$ and $Y^2$ are independently S, Se, or Te. $Ar^1$ and $Ar^2$ are independently ($C_6$-$C_{50}$)aryl.

The two groups Q in the compound of formula (3) may be identical to each other, in which case the compound is symmetric with respect to Q. Alternatively, the two groups Q may be different from each other, in which case the compound is asymmetric with respect to Q. Compounds of formula (3) that are either symmetric or asymmetric with respect to the two portions Q may be distinguishable in that in the symmetric compounds, both groups Q are identical groups $Ar^1$—$Y^1$—$R^3$—, whereas in the asymmetric compounds, one Q is $Ar^1$—$Y^1$—$R^3$— and the other Q is $Ar^2$—$Y^2$—$R^4$—, where $Ar^1$—$Y^1$—$R^3$— and $Ar^2$—$Y^2$—$R^4$— are not identical. Accordingly, with respect to the groups Q, compounds of formula (3) include symmetric compounds of formula (3A) and asymmetric compounds of formula (3B), as follows, where all variable groups in both formulas are defined as in to formula (3) and all variable groups having multiple instances in a single structure are identical in every instance:

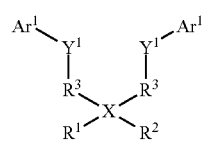

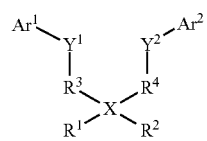

As will be subsequently described in greater detail, the heteroatom-bridge precursors of formula (1) may be prepared by converting a compound of formula (2) into the intermediate compound of formula (3). It should be understood that the intermediate compound of formula (3) in this regard includes compounds of formulas (3A) and (3B3). From the intermediate compound, leaving groups —$Y^1$—$Ar^1$ and/or —$Y^2$—$Ar^2$ are replaced with $Z^1$ from a metal halide to provide the heteroatom-bridge precursors of formula (1). The compound of formula (2) is the following:

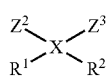

(2)

In formula (2), X, $R^1$, and $R^2$ are previously defined with respect to formulas (1) and (3), and $Z^2$ and $Z^3$ are independently selected from Cl, Br, I, and triflates.

In one or more embodiments, $R^1$ and $R^2$ may independently be a hydrogen atom or a $(C_1$-$C_{40})$hydrocarbyl chosen from $(C_1$-$C_{20})$alkyl, $(C_3$-$C_{20})$cycloalkyl or $(C_6$-$C_{20})$aryl. In some embodiments, $R^1$ and $R^2$ are chosen from methyl, ethyl, I-propyl, 2-propyl, 1-butyl, 2-butyl, 2-methylpropyl, 1,1-dimethylethyl, 1-pentyl, 1-hexyl, 1-heptyl, 1-nonyl, and 1-decyl. In various embodiments, $R^1$ and $R^2$ are chosen from cyclopropyl, cyclobutyl, cyclopentyl, cyclohexyl, cycloheptyl, cyclooctyl, cyclononyl, and cyclodecyl.

Common abbreviations are listed below:

$R^1$, $R^2$, $R^3$, $R^4$, X, $Y^1$, $Y^2$, $Z^1$, $Z^2$, $Z^3$, $Ar^1$, $Ar^2$, and m: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; $C_6D_6$: deuterated benzene or benzene-d6; $CDCl_3$: deuterated chloroform; BHT: butylated hydroxytoluene; TCB: 1,2,4-trichlorobenzene; $MgSO_4$: magnesium sulfate; n-BuLi: butyllithium; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $N_2$: nitrogen gas; PhMe: toluene; PPR: parallel pressure reactor; MAO: methylaluminoxane; MMAO: modified methylaluminoxane; TEA: Triethylamine; GC: gas chromatography; LC: liquid chromatography; NMR: nuclear magnetic resonance; MS: mass spectrometry; mmol: millimoles; M: molar solution; mM: millimolar solution; mL or ml: milliliters; min or mins: minutes; h or hrs: hours; d: days; RT: room temperature.

The term "independently selected" is used herein to indicate that the substituent groups, such as, $R^1$, $R^2$, $R^3$, and $R^4$, can be identical or different (e.g., $R^1$, $R^2$, $R^3$, and $R^4$ may all be substituted alkyls or $R^1$ and $R^2$ may be a cyclic alkyl and $R^3$ and $R^4$ may be a substituted alkyl, etc.) A chemical name associated with a substituent group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x$-$C_y)$" means that the unsubstituted form of the chemical group has from x carbon atoms to y carbon atoms, inclusive of x and y. For example, a $(C_1$-$C_{40})$hydrocarbyl is an hydrocarbyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x$-$C_y)$" parenthetical may contain more than y carbon atoms depending on the identity of any groups $R^S$. For example, a "$(C_1$-$C_{40})$alkyl substituted with exactly one group $R^S$, where $R^S$ is phenyl (—$C_6H_5$)" may contain from 7 to 46 carbon atoms. Thus, in general when a chemical group defined using the "$(C_x$-$C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

In some embodiments, each of the chemical groups (i.e., $R^1$, $Ar^1$, etc.) of the heteroatom-bridge precursor of formula (1) may be unsubstituted having no $R^S$ substituents. In other embodiments, at least one of the chemical groups of the heteroatom-bridge precursor of formula (1) may independently contain one or more than one $R^S$. In some embodiments, the sum total of $R^S$ in the chemical groups of the heteroatom-bridge precursor of formula (1) does not exceed 20. In other embodiments, the sum total of $R^S$ in the chemical groups of the heteroatom-bridge precursor of formula (1) does not exceed 10. For example, if each $R^{1-4}$ and $Ar^1$ was substituted with two $R^S$, then $Ar^2$ could not be substituted with an $R^S$ in embodiments in which the sum total of $R^S$ does not exceed 10. In another embodiment, the sum total of $R^S$ in the chemical groups of the heteroatom-bridge precursor of formula (1) may not exceed 5 $R^S$. When two or more than two $R^S$ are bonded to a same chemical group of the heteroatom-bridge precursor of formula (1), each $R^S$ is independently bonded to the same or different carbon atom or heteroatom and may include persubstitution of the chemical group.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (—H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent (e.g. $R^S$).

The term "—H" means a hydrogen or hydrogen radical that is covalently bonded to another atom. "Hydrogen" and "—H" are interchangeable, and unless clearly specified have identical meanings.

The term "$(C_1$-$C_{40})$hydrocarbyl" means a hydrocarbon radical of from 1 to 40 carbon atoms in which each hydrocarbon radical is aromatic or non-aromatic, saturated or unsaturated, straight chain or branched chain, cyclic (having three carbon atoms or more, and including monocyclic and polycyclic, fused and non-fused polycyclic, including bicyclic) or acyclic, and is substituted by one or more $R^S$ or unsubstituted.

In this disclosure, a $(C_1$-$C_{40})$hydrocarbyl may be an unsubstituted or substituted $(C_1$-$C_{40})$alkyl, $(C_3$-$C_{40})$cycloalkyl, $(C_3$-$C_{20})$cycloalkyl-$(C_1$-$C_{20})$alkylene, $(C_6$-$C_{40})$aryl, or $(C_6$-$C_{20})$aryl-$(C_1$-$C_{20})$alkylene (such as benzyl (—$CH_2$—$C_6H_5$)).

The term "$(C_1$-$C_{40})$alkyl" means a saturated straight or branched hydrocarbon radical of from 1 to 40 carbon atoms that is unsubstituted or substituted by one or more $R^S$. Examples of unsubstituted $(C_1$-$C_{40})$alkyl are unsubstituted $(C_1$-$C_{20})$alkyl; unsubstituted $(C_1$-$C_{10})$alkyl, unsubstituted $(C_1$-$C_{10})$alkyl; unsubstituted $(C_1$-$C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1$-$C_{40})$alkyl are substituted $(C_1$-$C_{20})$alkyl, substituted $(C_1$-$C_{12})$alkyl, substituted $(C_1$-$C_{10})$alkyl, trifluoromethyl, and [$C_{45}$]alkyl. The term "[$C_{45}$]alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be, for example, methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 50 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted $-CH_2CH_2-$, $-(CH_2)_3-$, $-(CH_2)_4-$, $-(CH_2)_5-$, $-(CH_2)_6-$, $-(CH_2)_7-$, $-(CH_2)_8-$, $-CH_2C^*HCH_3$, and $-(CH_2)_4C^*(H)(CH_3)$, in which "C*" denotes a carbon atom from which a hydrogen atom is removed to form a secondary or tertiary alkyl radical. Examples of substituted $(C_1-C_{40})$alkylene are substituted $(C_1-C_{20})$alkylene, $-CF_2-$, $-C(O)-$, and $-(CH_2)_{14}C(CH_3)_2(CH_2)_5-$ (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), $-N=C(R^C)_2$, $-Ge(R^C)_2-$, or $-Si(R^C)-$, where each $R^C$ and each $R^P$ is unsubstituted $(C_1-C_{18})$hydrocarbyl or $-H$, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{40})$heterohydrocarbyl" means a heterohydrocarbon radical of from 1 to 40 carbon atoms. The heterohydrocarbon of the $(C_1-C_{40})$heterohydrocarbyl has one or more heteroatoms. The radical of the heterohydrocarbyl may be on a carbon atom or a heteroatom. Each $(C_1-C_{40})$heterohydrocarbyl may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{40})$heterohydrocarbyl may be unsubstituted or substituted. Non-limiting examples of the $(C_1-C_{40})$heterohydrocarbyl may include: $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi-, or tricyclic heteroaromatic hydrocarbon radical of from 4 to 40 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P.

Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P.

Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{40})$heteroalkyl" means a saturated straight or branched chain radical containing one to forty carbon atoms and one or more heteroatom. The term "$(C_1-C_{40})$hetero-alkylene" means a saturated straight or branched chain diradical containing from 1 to 40 carbon atoms and one or more than one heteroatoms. The heteroatoms, of the heteroalkyls or the heteroalkylenes, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

In embodiments, the heteroatom-bridge precursors of formula (1) may be produced, for example, in accordance with Reaction Scheme 1 or Reaction Scheme 2. Reaction Scheme 1 describes preparation of symmetric heteroatom-bridge precursors according to formula (3A). Reaction Scheme 2 describes preparation of asymmetric heteroatom-bridge precursors according to formula (3B). It should be understood that Reaction Schemes 1 and 2 are provided herein for illustrative purposes only and are not intended to be limiting to any other embodiment described herein.

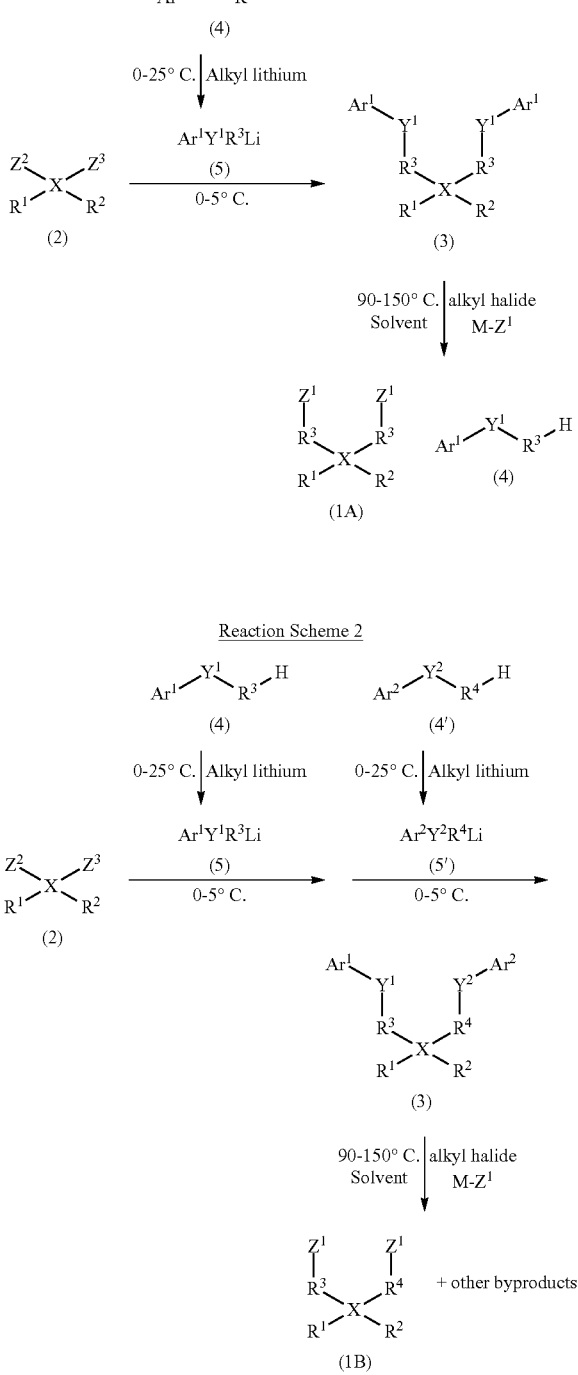

Consistent with Reaction Scheme 1, as presented, or as may be modified for the preparation of symmetric heteroatom-bridge precursors, methods for providing a heteroatom-bridge precursor from a compound according to formula (3) include reacting, at from 90° C. to 150° C., at least one alkyl halide, an alkali-metal halide $M-Z^1$, and a compound according to formula (3) (including compounds according to formula (3A) or (3B), as previously described). The reaction results in a heteroatom-bridge precursor having formula (1), as previously described. In embodiments, the at least one alkyl halide comprises $HR^3$-h, $HR^4$-h, or a combination thereof, where $R^3$ and $R^4$ are as defined in formulas (1) and (3), and where h is a halide chosen from Cl, Br, or I. To remove any doubt, the alkyl halide of Scheme 1 may include, but need not include, the same $R^3$ as is present in compounds (1B), (3), and (4). M may be an alkali metal selected from lithium, sodium, potassium, rubidium, and cesium. In embodiments, M is lithium. $Z^1$ is as defined in formula (1).

In embodiments, an alkyl lithium may be reacted with a compound of formula (4) and a compound of formula (4') to provide a compound of formula (5) and a compound of formula (5'), respectively.

The alkyl lithium is not particularly limited and may be, for example and without limitation, methyl lithium, ethyl lithium, isopropyl lithium, n-butyl lithium, isobutyl lithium, t-butyl lithium, 1,8-octyl dilithium, 1,7,18-octadecyl trilithium, decyl lithium, phenyl lithium, or a combination of two or more of these.

Optionally, the reaction of an alkyl lithium with a compound of formula (4) and a compound of formula (4') may be conducted in the presence of a solvent. In embodiments, the solvent may be a polar aprotic solvent. Suitable polar aprotic solvents that can be employed herein include, for example, glycol ethers, cyclic ethers, combinations thereof and the like. Exemplary polar aprotic solvents include, but are not limited to, dioxane, tetrahydrofuran, ethylene glycol dimethyl ethers, 1,3-dimethoxy propane, 1,2-dimethoxy propane, combinations thereof and the like.

In embodiments, the reaction of the alkyl lithium with a compound of formula (4) and a compound of formula (4') may be conducted in a reaction flask submerged in a bath at a temperature of from 0° C. to 25° C., such as from 1° C. to 24° C., 2° C. to 23° C., 3° C. to 22° C., 4° C. to 21° C., 5° C. to 20° C., 6° C. to 19° C., 7° C. to 18° C., 8° C. to 17° C., 9° C. to 16° C., 10° C. to 15° C., 11° C. to 14° C., or even 12° C. to 13° C. That is, the bath may be at a temperature of 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., or any fractional part thereof. It should be noted that the temperature of the reaction bath may fluctuate within a range formed from any of the temperatures listed above to any one of the temperatures listed above.

In embodiments, the alkyl lithium, the compound of formula (4), and the compound of formula (4') may be allowed to react for from 0.5 hours to 5 hours, from 1 hour to 4 hours, or even from 2 hours to 3 hours. That is, this reaction may take place over the course of 0.5 hours, 1 hour, 1.5 hours, 2 hours, 2.5 hours, 3 hours, 3.5 hours, 4 hours, 4.5 hours, 5 hours, or any fractional part thereof.

The methods for providing a heteroatom-bridge precursor from a compound according to formula (3) may further include preparing the compound of formula (3). In example embodiments, the compound of formula (5) and the compound of formula (5') may be reacted with a compound of formula (2) to provide a compound of formula (3). In example embodiments, preparing the compound of formula (3) may include reacting, at from 0° C. to 5° C., a compound having formula (2), as previously described, with a single lithium compound having the formula $Q^1$-Li where $Q^1$ is $Ar^1$—$Y^1$—$R^3$— as defined in formula (3), or with a first lithium compound having the formula $Q^1$-Li where $Q^1$ is $Ar^1$—$Y^1$—$R^3$— as defined in formula (3) and a second lithium compound having the formula $Q^2$-Li where $Q^2$ is $Ar^2$—$Y^2$—$R^4$— as defined in formula (3), to provide the compound of formula (3). The compound of formula (2) may be prepared by any suitable synthetic technique available to the person having ordinary skill in organic chemistry.

In some embodiments, reacting the compound having formula (2) with the at least one lithium compound comprises reacting the compound having formula (2) with the single lithium compound having the formula $Q^1$-Li, whereby both $L^1$ and $L^2$ of the heteroatom-bridge precursor having formula (1) are —$R^3$—$Z^1$ and are identical. Such embodiments are applicable to synthesis of symmetric heteroatom-bridge precursors according to formula (1A). In exemplary embodiments, $R^3$ in all instances in formulas (1) and (3) may be —$CH_2$—, or $R^3$ in all instances in formulas (1) and (3) may be —$CH_2CH_2$—. In one example embodiment, with respect to formulas (1A), (2), and (3A), $Z^2$ and $Z^3$ of formula (2) may be Cl; $Y^1$ in all instances may be S; $R^3$ in all instances may be —$CH_2$—; and $Ar^1$ in all instances may be 4-methylphenyl.

In further embodiments, reacting the compound having formula (2) with the at least one lithium compound comprises reacting the compound having formula (2) with a compound having the formula $Ar^1$—$Y^1$—$R^3$—Li (compound (5)) and a compound having the formula $Ar^2$—$Y^2$—$R^4$—Li (compound (5')), whereby $L^1$ and $L^2$ of the heteroatom-bridge having formula (1) are not identical. Such embodiments are applicable to synthesis of asymmetric heteroatom-bridge precursors according to formula (1B).

In some embodiments, the methods for providing a heteroatom-bridge precursor from a compound according to formula (3) may further include either preparing the single lithium compound $Q^1$-Li or preparing the first lithium compound $Q^1$-Li, the second lithium compound $Q^2$-Li, or both. In the preparation of symmetric compounds of formula (1A), only one lithium compound $Q^1$-Li is required for the conversion of the compound of formula (2) to the compound of formula (3) or (3A). Thus, preparing the single lithium compound $Q^1$-Li may include reacting, at from 0° C. to 25° C., an alkyl lithium compound with a compound having a formula $Ar^1$—$Y^1$—$R^3$—H (compound (4)) to provide the single lithium compound $Q^1$-Li. In the preparation of asymmetric compounds of formula (1B), however, two lithium compounds $Q^1$-Li and $Q^2$-Li may be necessary, where $Q^1$ and $Q^2$ are not identical. In embodiments, one or both of the lithium compounds $Q^1$-Li and $Q^2$-Li may be prepared by performing at least one of the following: reacting, at from 0° C. to 25° C., an alkyl lithium compound with a compound having a formula $Ar^1$—$Y^1$—$R^3$—H (compound (4)) to provide the first lithium compound $Q^1$-Li; and reacting, at from 0° C. to 25° C., an alkyl lithium compound with a compound having a formula $Ar^2$—$Y^2$—$R^4$—H (compound (4')) to provide the first lithium compound $Q^2$-Li.

Optionally, reacting the compound having formula (2) with the at least one lithium compound to provide a compound of formula (3) may be conducted in the presence of a solvent. In embodiments, the solvent may be a polar aprotic solvent. Suitable polar aprotic solvents that can be employed herein include, for example, glycol ethers, cyclic ethers, combinations thereof and the like. Exemplary polar aprotic solvents include, but are not limited to, dioxane, tetrahydrofuran, ethylene glycol dimethyl ethers, 1,3-dimethoxy propane, 1,2-dimethoxy propane, combinations thereof and the like. In embodiments, the same solvent used for the reaction of the alkyl lithium with a compound of formula (4) and a compound of formula (4') may be used for this reaction of the compounds of formula (5) and formula (5') with the compound of formula (2).

In embodiments, the reaction of the compounds of formula (5) and formula (5') with the compound of formula (2)

may be conducted in a reaction flask submerged in a bath at a temperature of from 0° C. to 5° C., 1° C. to 4° C., or even 2° C. to 3° C. That is, the bath may be at a temperature of 0° C., 1° C., 2° C., 3° C., 4° C., 5° C., or any fractional part thereof. It should be noted that the temperature of the reaction bath may fluctuate within a range formed from any of the temperatures listed above to any of the temperatures listed above.

In embodiments, the reaction of the compounds of formula (5) and formula (5') with the compound of formula (2) may take place rapidly. For instance, the reaction may be completed within 0.5 to 5 minutes, 1 minute to 4 minutes, or even 2 minutes to 3 minutes. That is, the reagents may be allowed to react for 0.5 minutes, 1 minute, 1.5 minutes, 2 minutes, 2.5 minutes, 3 minutes, 3.5 minutes, 4 minutes, 4.5 minutes, 5 minutes, or any fractional part thereof.

In embodiments, the compound of formula (3) may be reacted with an alkyl halide and an alkali-metal halide (M-$Z^1$) to provide the heteroatom-bridge precursors of formula (1) and the compounds of formula (4) and formula (4'). The compounds of formula (4) and formula (4') may be recycled to provide the compound of formula (5) and formula (5'), respectively.

Optionally, this reaction may be conducted in the presence of a solvent. In embodiments, the solvent may be a polar aprotic solvent. Suitable polar aprotic solvents that can be employed herein include, for example, ethers, amides, sulfones, phosphoramides, combinations thereof and the like. Exemplary polar aprotic solvents include, but are not limited to, dimethylformamide, dimethylsulfoxide, dimethyl acetamide, N-methyl pyrrolidinone, dioxane, acetonitrile, ethylene glycol dimethyl ethers, 1,3-dimethoxy propane, 1,2-dimethoxy propane, tetramethylene sulfone, hexamethyl phosphoramide, combinations thereof and the like.

In embodiments, the reaction of the compound of formula (3) with an alkyl halide and a lithium halide may be conducted in a reaction flask submerged in a bath at a temperature of from 90° C. to 150° C., 95° C. to 145° C., 100° C. to 140° C., 105° C. to 135° C., 110° C. to 130° C., or even 115° C. to 125° C. That is, the bath may be at a temperature of 90° C., 95° C., 100° C., 105° C., 110° C., 115° C., 120° C., 125° C., 130° C., 135° C., 140° C., 145° C., 150° C., or any fractional part thereof. It should be noted that the temperature of the reaction bath may fluctuate within a range formed from any of the temperatures listed above. In embodiments, the reaction may be conducted in a bath having a temperature ranging from 115° C. to 140° C. or from 120° C. to 140° C.

In embodiments, the compound of formula (3), the alkyl halide, and the lithium halide may be allowed to react for from 5 hours to 20 hours, from 6 hour to 19 hours, from 7 hour to 18 hours, from 8 hour to 17 hours, from 9 hour to 16 hours, from 10 hour to 15 hours, from 11 hour to 14 hours, or even from 12 hours to 13 hours. That is, this reaction may take place over the course of 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, or any fractional part thereof.

The alkyl halide may be selected from H—$(CR^C{}_2)_m$-h, where h is a halogen radical and $R^C$ and m are as defined above regarding $R^3$ and $R^4$. In embodiments, the alkyl halide may be, but need not be, $HR^3$-h and $HR^4$-h, such that the reaction of the compound of formula (3) with the alkyl halide and the lithium halide produces the compounds of formula (4) and of formula (4') as byproducts.

The metal halide may be selected from LiCl, LiBr, and LiI and is the source of $Z^1$ in the compound of formula (1).

In example embodiments, the methods for providing a heteroatom-bridge precursor from a compound according to formula (3) may include synthetic pathways as previously described, in which $Z^2$ and $Z^3$ of formula (2) are Cl.

In example embodiments, the methods for providing a heteroatom-bridge precursor from a compound according to formula (3) may include synthetic pathways as previously described, in which $Y^1$ and $Y^2$ in all instances are S.

In example embodiments, the methods for providing a heteroatom-bridge precursor from a compound according to formula (3) may include synthetic pathways as previously described, in which $Ar^1$ and $Ar^2$ are independently selected from the group consisting of phenyl, 2-methylphenyl, 3-methylphenyl, and 4-methylphenyl.

In example embodiments, the methods for providing a heteroatom-bridge precursor from a compound according to formula (3) may include synthetic pathways as previously described, in which $Ar^1$ and $Ar^2$ in all instances are phenyl.

In example embodiments, the methods for providing a heteroatom-bridge precursor from a compound according to formula (3) may include synthetic pathways as previously described, in which X is Si or Ge.

In example embodiments, the methods for providing a heteroatom-bridge precursor from a compound according to formula (3) may include synthetic pathways as previously described, in which $R^1$ and $R^2$ are independently ($C_1$-$C_{12}$) alkyl.

Catalysts for Polyolefin Synthesis

The heteroatom-bridge precursors previously described herein may be utilized to prepare metal-ligand complex catalysts that may then be used in the polymerization of olefins, primarily ethylene and propylene. The metal-ligand complexes may be prepared from the heteroatom-bridge precursors in accordance with, for example, an exemplary synthesis procedure found in WO 2018/022975, the contents of which are incorporated herein by reference.

One or more features of the present disclosure are illustrated in view of the examples as follows:

EXAMPLES

Example 1: Preparation of di-isopropyl(bis(p-tolylthio)methyl)silane

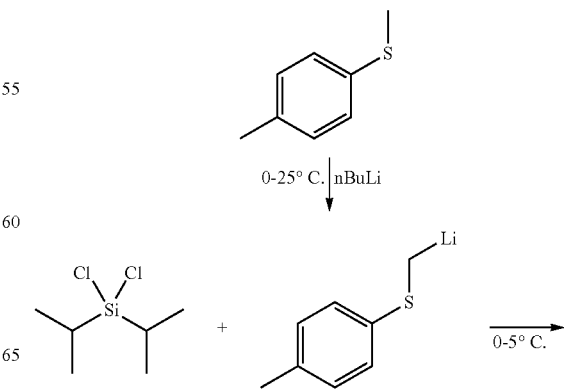

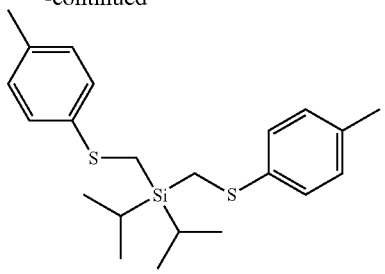

A 500 mL flask charged with 4-(methylthio)toluene (24.5 mL, 183 mmol) and 200 mL THF. The flask was cooled to 0° C. under an inert atmosphere and n-BuLi (67.2 mL, 175 mmol, 2.1 equiv) was added dropwise quickly. The pale yellow solution was stirred at this temperature for 1 hour and then slowly warmed to room temperature for 2 hours. The reaction mixture was again cooled to 0° C., and a solution of iPr$_2$SiCl$_2$ in THF (50 mL) was added dropwise at 0° C. After 1 minute, MeOH (10 mL) was added to quench the reaction. The resulting mixture was diluted with ether (50 mL) and washed with brine. The organic layer was dried over MgSO$_4$, filtered through a short pad of silica gel, and concentrated under reduced pressure to yield a yellow oil (~37 g, >100% yield). Residual (4-methylthio)toluene and THF was identified in the crude mixture. Optionally, these impurities may be removed by fractional distillation.

$^1$H NMR (400 MHz, CDCl$_3$) δ 1.16 (d, J=8 Hz, 12H), 1.24 (m, 2H), 2.31 (s, 6H), 2.35 (s, 4H), 7.09 (d, J=8 Hz, 4H), 7.22 (d, J=8 Hz, 4H). $^{13}$C{$^1$H} NMR (100 MHz, CDCl$_3$) δ 11.4, 13.2, 18.1, 20.9, 126.8, 129.5, 134.8, 136.5.

Example 2: Preparation of Bis(iodomethyl)diisopropylsilane

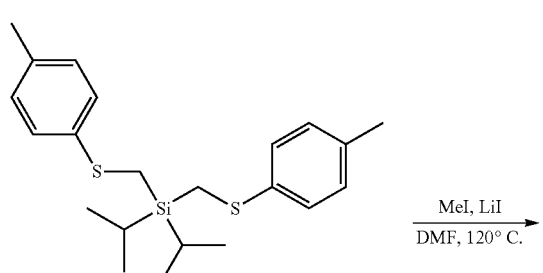

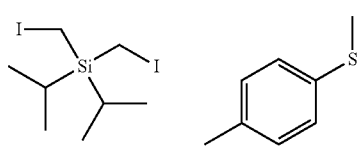

In an inert atmosphere glovebox, a 300 mL Parr vessel was charged with crude diisopropyl(bis(p-tolylthio)methyl) silane (7.80 g, 20.1 mmol), iodomethane (30.0 mL, 481 mmol, 24 equiv), lithium iodide (2.69 g, 20.1 mmol), and DMF (20 mL). The vessel was sealed inside the glovebox and heated to 120° C. overnight. The vessel was cooled to room temperature using an ice bath and sampled to examine the progress of the reaction. When complete, the contents of the vessel were poured into a 250 mL round bottom flask, and the vessel was rinsed with 20 mL CH$_2$Cl$_2$. The solvent was removed by rotary evaporation to yield a dark residue, which was dissolved in 100 mL hexane and washed with 3×200 mL of water. After isolating the organic layer and drying with MgSO$_4$, the mixture was filtered and the solvent removed by rotary evaporation to yield a dark orange residue (10.3 g, 88% yield based on NMR integration, 83% GC purity). Vacuum distillation of this residue removed (4-methylthio)toluene to yield the crude product.

$^1$H NMR (400 MHz, CDCl$_3$) δ 1.13 (d, J=8 Hz, 12H), 1.32 (m, 2H), 2.18 (s, 4H). $^{13}$C{$^1$H} NMR (100 MHz, CDCl$_3$) δ −19.8 (—SiCH$_2$I), 11.7, 18.1.

Example 3: Preparation of an Exemplary Heteroatom-Bridged Metal Ligand Complex Catalyst

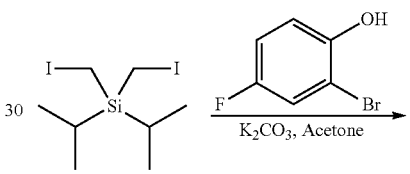

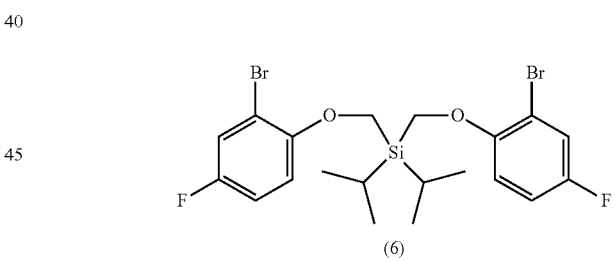

To a 250 mL round bottom flask were added bis(iodomethyl)diisopropylsilane (7.923 g, 20.0 mmol), 2-bromo-4-fluorophenol (11.459 g, 60.0 mmol), K$_2$CO$_3$ (11.056 g, 80.0 mmol), and acetone (50 mL). The reaction mixture was heated to 60° C. for 12 hours then cooled to room temperature. The reaction mixture was filtered through a short plug of silica gel and rinsed with ether. Solvents were then removed. The residue was purified by column chromatography using ether/hexane (0/100 ramp to 30/70 during the course of the elution). 7.428 g of bis((2-bromo-4-fluorophenoxy)methyl)diisopropylsilane (compound (6)) were obtained (71% yield) as a colorless oil.

$^1$H NMR (400 MHz, CDCl$_3$) δ 7.29-7.24 (m, 2H), 6.98 (dd, J=6.4, 1.7 Hz, 4H), 3.92 (s, 4H), 1.44-1.32 (m, 2H), 1.20 (d, J=7.4 Hz, 12H). $^{19}$F NMR (376 MHz, CDCl$_3$) δ −122.63 (s, 2F).

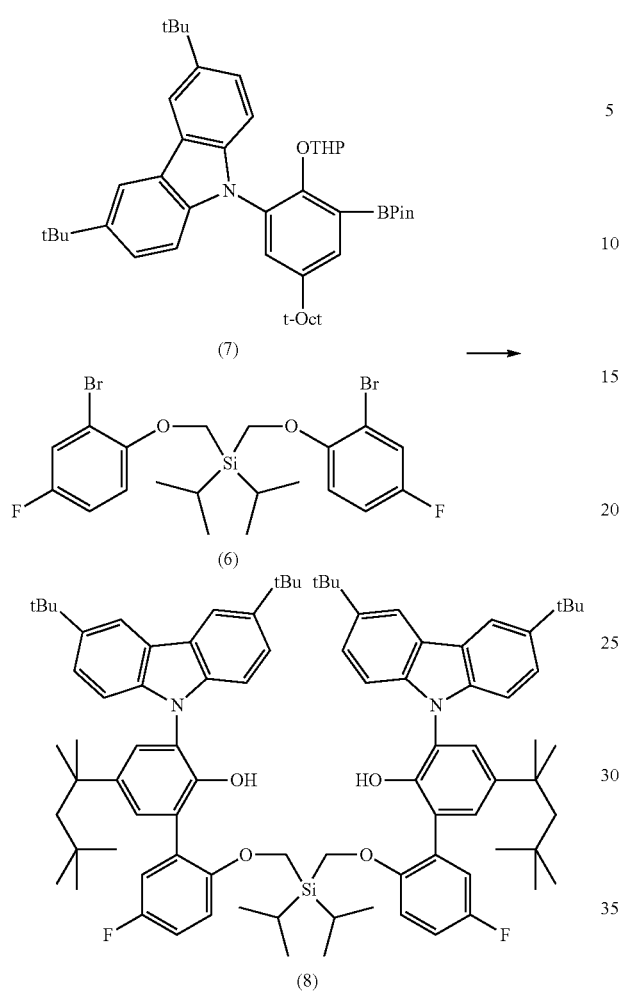

(7)

(6)

(8)

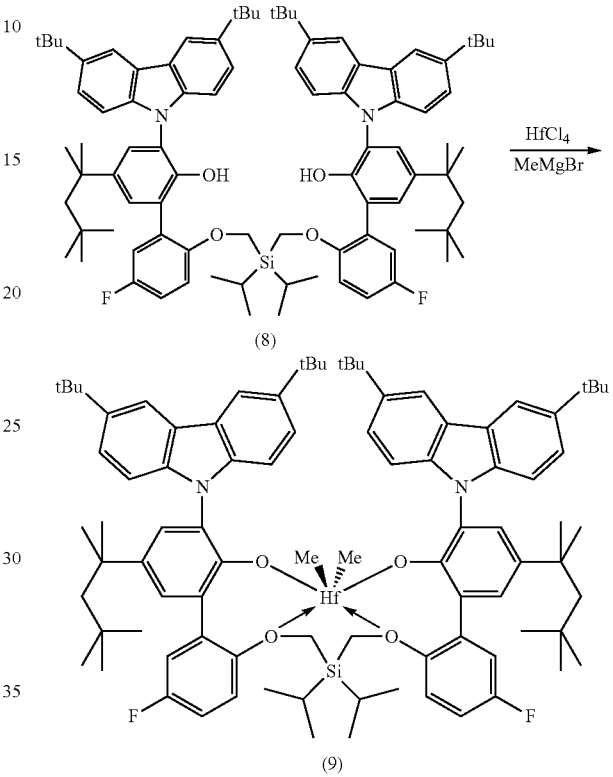

(8)

(9)

To a 40-mL vial were added bis((2-bromo-4-fluorophenoxy)methyl)diisopropylsilane (compound (6), 1.045 g, 2.0 mmol), compound (7) (4.164 g, 6.0 mmol), Na$_2$CO$_3$ (1.484 g, 14.0 mmol), and degassed THF (12 mL), all in a glovebox. The vial was capped, taken out of the glovebox, and water (5 mL) was added. The stirred solution was purged with nitrogen for 5 min to ensure adequate degassing. A premixed solution of Pd(dba)$_2$ (0.046 g, 0.08 mmol) and tBu$_3$P (0.032 g, 0.16 mmol) in THF (3 mL) (prepared inside glovebox) was then added in one portion. The reaction was then heated at 70° C. for 18 hours. After cooling to rt, the organic layer was transferred to a 100-mL round bottom flask, and the vial was rinsed with THF (4 mL), which was then added to the 100-mL round bottom flask. MeOH (15 mL) and concentrated HCl (1.0 mL) were added, and the resulting solution was refluxed (80-90° C.) for 2 hours. The reaction mixture was concentrated by partial evaporation of the solvent. Water (50 mL) was added and the product was extracted by ether (80 mL×2). The combined organic layer was dried over MgSO$_4$ and filtered through a short pad of silica gel. After removing solvents, the residue was purified by crystallization in ether/ethanol affording 2.42 g of the product (compound (8)) as a white powder (91% yield).

$^1$H NMR (400 MHz, CDCl$_3$) δ 8.25 (brs, 4H), 7.39 (d, J=8.5 Hz, 4H), 7.33 (d, J=2.5 Hz, 2H), 7.13 (d, J=2.4 Hz, 2H), 6.97 (brs, 4H), 6.77 (dd, J=8.7, 3.1 Hz, 2H), 6.30-6.17 (m, 2H), 5.43-5.26 (m, 2H), 5.22 (s, 2H), 3.43-3.06 (m, 4H), 1.66 (s, 4H), 1.48 (s, 36H), 1.29 (s, 12H), 0.83-0.69 (m, 32H). $^{19}$F NMR (376 MHz, CDCl$_3$) δ −124.11 (s, 2F). $^{13}$C NMR (100 MHz, CDCl$_3$) δ 157.8, 155.5, 153.0, 147.8, 142.8, 142.7, 139.9, 128.9, 127.2, 126.7, 124.0, 123.6, 123.2, 117.62 (d, J=23.2 Hz), 116.0, 115.20 (d, J=22.8 Hz), 111.3 (d, J=8.8 Hz), 109.5, 56.8, 55.8, 38.1, 34.8, 32.4, 32.1, 31.9, 31.6, 18.1, 9.6.

Inside a glove box, to an oven-dried 100-mL bottle equipped with a stir bar was added suspended HfCl$_4$ (0.641 g, 2.0 mmol) in anhydrous toluene (60 mL). The bottle was kept in a freezer at −30° C. for one hour then removed from the freezer. The reaction mixture was stirred vigorously, and a MeMgBr solution (3 M in ether, 2.8 mL, 8.4 mmol) was added. After 13 min, ligand powder (compound (8)) was added as solid. Stirring was continued at room temperature overnight. Solvents were removed under vacuum affording a dark grey solid. The solids were extracted with anhydrous hexane (90 mL) then filtered. The filtrate was concentrated to about 5-10 mL then kept in freezer overnight. The top clear solution was decanted and the white solid was dried under vacuum to afford 2.53 g of the product (compound (9)) (82% yield).

$^1$H NMR (400 MHz, C$_6$D$_6$) δ 8.64-8.60 (m, 2H), 8.42-8.38 (m, 2H), 7.67-7.47 (m, 8H), 7.45-7.39 (m, 2H), 7.26 (d, J=2.5 Hz, 2H), 7.07 (dd, J=8.9, 3.1 Hz, 3H), 6.84-6.75 (m, 2H), 5.27-5.19 (m, 2H), 4.35 (d, J=14.1 Hz, 2H), 3.29 (d, J=14.1 Hz, 2H), 1.57 (d, J=3.5 Hz, 4H), 1.47 (s, 18H), 1.34-1.19 (m, 30H), 0.80 (s, 18H), 0.58-0.48 (m, 12H), 0.35-0.24 (m, 2H), −1.08 (s, 6H). $^{19}$F NMR (376 MHz, CDCl$_3$) δ −116.40 (m, 2F).

Aspects

According to an aspect, either alone or in combination with any other aspect, a compound of Q$_2$X(R$^1$)(R$^2$) is provided. $R^1$ and $R^2$ are independently selected from a hydrogen atom, $(C_1-C_{40})$hydrocarbyl and, optionally, $R^1$ and $R^2$ are connected to form a ring having from 3 to 50 atoms in the ring, excluding hydrogen atoms. X is Si, Ge, Sn, or Pb. Each Q is independently $Ar^1$—$Y^1$—$R^3$— or $Ar^2$—$Y^2$—$R^4$—. $R^3$ and $R^4$ are independently selected from —$(CR^C_2)_m$—, where m is 1 or 2, and where each $R^C$ is independently selected from the group consisting of $(C_1-C_{40})$hydrocarbyl, $(C_1-C_{40})$heterohydrocarbyl, and —H. $Y^1$ and $Y^2$ are independently S, Se, or Te. $Ar^1$ and $Ar^2$ are independently $(C_6-C_{50})$aryl. $Ar^1$—$Y^1$—$R^3$— and $Ar^2$—$Y^2$—$R^4$— are not identical.

According to a second aspect, either alone or in combination with any other aspect, $Y^1$ and $Y^2$ are Se.

According to a third aspect, either alone or in combination with any other aspect, $Y^1$ and $Y^2$ are S.

According to a fourth aspect, either alone or in combination with any other aspect, $R^3$ and $R^4$ are —$CH_2$—.

According to a fifth aspect, either alone or in combination with any other aspect, $R^3$ and $R^4$ are —$CH_2CH_2$—.

According to a sixth aspect, either alone or in combination with any other aspect, $Ar^1$ and $Ar^2$ are independently selected from the group consisting of phenyl, 2-methylphenyl, 3-methylphenyl, and 4-methylphenyl.

According to a seventh aspect, either alone or in combination with any other aspect, $Ar^1$ and $Ar^2$ are phenyl.

According to an eighth aspect, either alone or in combination with any other aspect, X is Si.

According to a ninth aspect, either alone or in combination with any other aspect, $R^1$ and $R^2$ are independently $(C_1-C_{12})$alkyl.

According to a tenth aspect, either alone or in combination with any other aspect, each Q is $Ar^1$—$Y^1$—$R^3$— and is identical.

According to an eleventh aspect, either alone or in combination with any other aspect, each Q is $Ar^1$—$Y^1$—$R^3$—, where $R^3$ is —$CH_2$—, $Y^1$ is S, and $Ar^1$ is 4-methylphenyl.

According to a twelfth aspect, either alone or in combination with any other aspect, a method for providing a heteroatom-bridge precursor, $(L^1)(L^2)X(R^1)(R^2)$, includes reacting at least one alkyl halide, a metal halide, and a compound of formula $Q_2X(R_1)(R_2)$, at from 90° C. to 150° C., where X, Q, $R^1$, and $R^2$ are as defined above, to provide the heteroatom-bridge precursor. $L^1$ and $L^2$ are independently —$R^3$—$Z^1$ or —$R^4$—$Z^1$ and each $Z^1$ is independently selected from Cl, Br, and I.

According to a thirteenth aspect, either alone or in combination with any other aspect, the method further includes preparing the compound of formula $Q_2X(R_1)(R_2)$ via reacting, at from 0° C. to 5° C., a compound of formula $(Z^2)(Z^3)X(R^1)(R^2)$ with either a single lithium compound having the formula $Q^1$-Li where $Q^1$ is $Ar^1$—$Y^1$—$R^3$—, as defined above, or with a first lithium compound having the formula $Q^1$-Li where $Q^1$ is $Ar^1$—$Y^1$—$R^3$—, as defined above, and a second lithium compound having the formula $Q^2$-Li where $Q^2$ is $Ar^2$—$Y^2$—$R^4$—, as defined above, to provide the compound of formula $Q_2X(R_1)(R_2)$. $Z^2$ and $Z^3$ are independently selected from Cl, Br, I, and a triflate.

According to a fourteenth aspect, either alone or in combination with any other aspect, reacting the compound having formula $(Z^2)(Z^3)X(R^1)(R^2)$ with the at least lithium compound includes reacting the compound having formula $(Z^2)(Z^3)X(R^1)(R^2)$ with the single lithium compound having the formula $Q^1$-Li, whereby both $L^1$ and $L^2$ of the heteroatom-bridge precursor having formula $(L^1)(L^2)X(R^1)(R^2)$ are —$R^3$—$Z^1$ and are identical.

According to a fifteenth aspect, either alone or in combination with any other aspect, $R^3$ in all instances is —$CH_2$— in the method.

According to a sixteenth aspect, either alone or in combination with any other aspect, $R^3$ in all instances is —$CH_2CH_2$— in the method.

According to a seventeenth aspect, either alone or in combination with any other aspect, $Z^2$ and $Z^3$ are Cl, $Y^1$ in all instances is S, $R^3$ in all instances is —$CH_2$—, and $Ar^1$ in all instances is 4-methylphenyl.

According to an eighteenth aspect, reacting the compound having formula $(Z^2)(Z^3)X(R^1)(R^2)$ with the at least one lithium compound includes reacting the compound having formula $(Z^2)(Z^3)X(R^1)(R^2)$ with a compound having the formula $Ar^1$—$Y^1$—$R^3$—Li and a compound having the formula $Ar^2$—$Y^2$—$R^4$—Li, whereby $L^1$ and $L^2$ of the heteroatom-bridge having formula $(L^1)(L^2)X(R^1)(R^2)$ are not identical.

According to a nineteenth aspect, either alone or in combination with any other aspect, $Z^2$ and $Z^3$ are Cl in the method.

According to a twentieth aspect, either alone or in combination with any other aspect, $Y^1$ and $Y^2$ in all instances are S in the method.

According to a twenty-first aspect, either alone or in combination with any other aspect, $Ar^1$ and $Ar^2$ are independently selected from the group consisting of phenyl, 2-methylphenyl, 3-methylphenyl, and 4-methylphenyl in the method.

According to a twenty-second aspect, either alone or in combination with any other aspect, $Ar^1$ and $Ar^2$ in all instances are phenyl in the method.

According to a twenty-third aspect, either alone or in combination with any other aspect, X is Si or Ge in the method.

According a twenty-fourth aspect, either alone or in combination with any other aspect, $R^1$ and $R^2$ are independently $(C_1-C_{12})$alkyl in the method.

According to a twenty-fifth aspect, either alone or in combination with any other aspect, the method further includes either preparing the single lithium compound $Q^1$-Li by reacting, at from 0° C. to 25° C., an alkyl lithium compound with a compound having a formula $Ar^1$—$Y^1$—$R^3$—H to provide the single lithium compound $Q^1$-Li, or preparing the first lithium compound $Q^1$-Li, the second lithium compound $Q^2$-Li, or both, by performing at least one of reacting, at from 0° C. to 25° C., an alkyl lithium compound with a compound having a formula $Ar^1$—$Y^1$—$R^3$—H to provide the first lithium compound $Q^1$-Li, and reacting, at from 0° C. to 25° C., an alkyl lithium compound with a compound having a formula $Ar^2$—$Y^2$—$R^4$—H to provide the first lithium compound $Q^2$-Li.

According to a twenty-sixth aspect, either alone or in combination with any other aspect, the at least one alkyl halide comprises $HR^3$-h, $HR^4$-h, or a combination thereof, where h is a halogen chosen from Cl, Br, or I, and the metal halide comprises $Z^1$—Li.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A method for providing a heteroatom-bridge precursor of formula (1) from a compound according to formula (3):

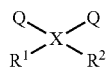

(3)

where:
R$^1$ and R$^2$ are independently selected from a group consisting of hydrogen atom, (C$_1$-C$_{40}$)hydrocarbyl and, optionally, R$^1$ and R$^2$ are connected to form a 3-50 membered ring;
X is Si, Ge, Sn, or Pb; and
each Q is independently Ar$^1$—Y$^1$—R$^3$— or Ar$^2$—Y$^2$—R$^4$—, wherein:
R$^3$ and R$^4$ are —CH$_2$—, or —CH$_2$CH$_2$—;
Y$^1$ and Y$^2$ are independently S or Se;
Ar$^1$ and Ar$^2$ are independently selected from the group consisting of 2-methylphenyl, 3-methylphenyl, and 4-methylphenyl;
Ar$^1$—Y$^1$— and Ar$^2$—Y$^2$— are not identical; and
R$^3$ and R$^4$ are identical;
the method comprising:
reacting, at from 90° C. to 150° C., at least one alkyl halide, an alkali-metal halide, and the compound according to formula (3) to provide a heteroatom-bridge precursor having formula (1):

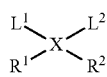

(1)

where:
R$^1$, R$^2$, and X are as defined in formula (3); and
L$^1$ and L$^2$ are independently —R$^3$—Z$^1$ or —R$^4$—Z$^1$, where R$^3$ and R$^4$ are as defined in formula (3), and where each Z$^1$ is independently selected from a group consisting of Cl, Br, and I.

2. The method of claim 1, further comprising preparing the compound of formula (3), wherein preparing the compound of formula (3) comprises:
reacting, at from 0° C. to 5° C., a compound having formula (2):

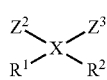

(2)

where:
X, R$^1$, and R$^2$ are as defined in formula (3), and
Z$^2$ and Z$^3$ are independently selected from a group consisting of Cl, Br, I, and triflate,
with a first lithium compound having the formula Q$^1$-Li where Q$^1$ is Ar$^1$—Y$^1$—R$^3$— as defined in formula (3), or a first lithium compound having the formula Q$^1$-Li where Q$^1$ is Ar$^1$—Y$^1$—R$^3$— as defined in formula (3) and a second lithium compound having the formula Q$^2$-Li where Q$^2$ is Ar$^2$—Y$^2$—R$^4$— as defined in formula (3), to provide the compound of formula (3).

3. The method of claim 2, wherein reacting the compound having formula (2) with the first lithium compound having the formula Q$^1$-Li, whereby L$^1$ and L$^2$ of the heteroatom-bridge precursor having formula (1) are —R$^3$—Z$^1$.

4. The method of claim 3, wherein R$^3$ is —CH$_2$—.

5. The method of claim 3, wherein:
Z$^2$ and Z$^3$ of formula (2) are Cl;
Y$^1$ is S;
and
Ar$^1$ is 4-methylphenyl.

6. The method of claim 2, wherein the compound having formula (2) reacts with a compound having the formula Ar$^1$—Y$^1$—R$^3$—Li and a compound having the formula Ar$^2$—Y$^2$—R$^4$—Li, and wherein L$^1$ and L$^2$ of the heteroatom-bridge precursor having formula (1) are identical.

7. The method of claim 2, wherein Z$^2$ and Z$^3$ of formula (2) are Cl.

8. The method of claim 1, wherein Y$^1$ and Y$^2$ in all instances are S.

9. The method of claim 1, wherein X is Si or Ge, and wherein R$^1$ and R$^2$ are independently (C$_1$-C$_{12}$)alkyl.

10. The method of claim 2, further comprising (a), (b), or both (a) and (b):
(a) preparing the first lithium compound Q$^1$-Li by:
reacting, at from 0° C. to 25° C., an alkyl lithium compound with a compound having a formula Ar$^1$—Y$^1$—R$^3$—H to provide the first lithium compound Q$^1$-Li; or
(b) preparing the first lithium compound Q$^1$-Li, the second lithium compound Q$^2$-Li, or both, by performing (1), (2), or both (1) and (2):
(1) reacting, at from 0° C. to 25° C., an alkyl lithium compound with a compound having a formula Ar$^1$—Y$^1$—R$^3$—H to provide the first lithium compound Q$^1$-Li; and/or
(2) reacting, at from 0° C. to 25° C., an alkyl lithium compound with a compound having a formula Ar$^2$—Y$^2$—R$^4$—H to provide the second lithium compound Q$^2$-Li.

11. The method of claim 1, wherein:
the at least one alkyl halide is HR$^3$-h, HR$^4$-h, or a combination thereof, where R$^3$ and R$^4$ are as defined in formulas (1) and (3), and where h is a halogen selected from a group consisting of Cl, Br, or I; and
the alkali-metal halide is Z$^1$—Li, where Z$^1$ is as defined in formula (1).

* * * * *